United States Patent
Jain et al.

(10) Patent No.: US 11,003,768 B2
(45) Date of Patent: May 11, 2021

(54) SYSTEM AND METHOD FOR CONSENT CENTRIC DATA COMPLIANCE CHECKING

(71) Applicant: Tata Consultancy Services Limited, Mumbai (IN)

(72) Inventors: Rohit Jain, Pune (IN); Jayant Sudhakarrao Dani, Mumbai (IN); Kiran Kumar Nutheti, Hyderabad (IN); Sridhar Gopal Pattar, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 280 days.

(21) Appl. No.: 15/862,937

(22) Filed: Jan. 5, 2018

(65) Prior Publication Data
US 2018/0189485 A1   Jul. 5, 2018

(30) Foreign Application Priority Data
Jan. 5, 2017   (IN) .............................. 201721000532

(51) Int. Cl.
*H04L 29/06* (2006.01)
*G06F 21/55* (2013.01)
*G06F 21/60* (2013.01)
*G06F 21/62* (2013.01)
*H04L 9/14* (2006.01)

(52) U.S. Cl.
CPC .......... *G06F 21/556* (2013.01); *G06F 21/602* (2013.01); *G06F 21/606* (2013.01); *G06F 21/6209* (2013.01); *G06F 21/6218* (2013.01); *G06F 21/6245* (2013.01); *G06F 21/6254* (2013.01); *H04L 9/14* (2013.01); *G06F 2221/034* (2013.01)

(58) Field of Classification Search
CPC .. G06F 21/556; G06F 21/6218; G06F 21/602; G06F 2221/034; G06F 21/6254; G06F 21/6245; G06F 21/6209; G06F 21/606; H04L 9/14
See application file for complete search history.

(56) References Cited

U.S. PATENT DOCUMENTS

| | | | |
|---|---|---|---|
| 6,014,638 A * | 1/2000 | Burge | G06Q 30/02 705/27.1 |
| 9,503,452 B1 * | 11/2016 | Kumar | H04L 67/306 |
| 9,740,583 B1 * | 8/2017 | Brandwine | G06F 11/1448 |
| 2006/0004588 A1 * | 1/2006 | Ananda | G06Q 10/00 705/67 |
| 2006/0179432 A1 * | 8/2006 | Walinga | H04L 41/0806 717/171 |

(Continued)

*Primary Examiner* — Carl G Colin
*Assistant Examiner* — Hany S. Gadalla
(74) *Attorney, Agent, or Firm* — Finnegan, Henderson, Farabow, Garrett & Dunner LLP

(57) ABSTRACT

Techniques for consent centric data compliance checking are disclosed. In an example embodiment, multiple applications associated with an organization are received. Further, a purpose for each of the multiple applications associated with the organization is derived. Furthermore, consents of data subjects are captured for the derived purpose of each of the multiple application in a data subject preference master. Also, reconciliation of the data subject preference master and data subjects' data available in the organization is performed to determine consent lacking information.

9 Claims, 4 Drawing Sheets

(56) References Cited

U.S. PATENT DOCUMENTS

| | | | |
|---|---|---|---|
| 2006/0248592 A1* | 11/2006 | Agrawal | G06F 21/6245 |
| | | | 726/26 |
| 2006/0282660 A1* | 12/2006 | Varghese | G06Q 20/341 |
| | | | 713/155 |
| 2008/0244447 A1* | 10/2008 | Sagar | G06F 3/0482 |
| | | | 715/810 |
| 2010/0257533 A1* | 10/2010 | Dvir | G06F 11/0715 |
| | | | 718/103 |
| 2011/0145920 A1* | 6/2011 | Mahaffey | G06F 21/564 |
| | | | 726/22 |
| 2012/0290544 A1 | 11/2012 | Abuelsaad et al. | |
| 2013/0205359 A1* | 8/2013 | Choi | G06F 21/57 |
| | | | 726/1 |
| 2014/0100875 A1* | 4/2014 | Davis | G06F 19/00 |
| | | | 705/3 |
| 2016/0358287 A1 | 12/2016 | Willard et al. | |
| 2017/0236129 A1 | 8/2017 | Kholkar et al. | |
| 2017/0280474 A1* | 9/2017 | Vesterinen | H04W 28/22 |

\* cited by examiner

| P.INDEX | KEY VALUE PURPOSE CODE | INPUT VALUES | DERIVED PURPOSE |
|---|---|---|---|
| 1 | C360X | APP1, ROLE B, DATASET X | CUSTOMER GUIDANCE |
| 2 | C360Y | APP2, ROLE B, DATASET Y | CUSTOMER CARE |
| 3 | C360Z | APP1, ROLE C, DATASET X | MARKETING |

200A

| PURPOSE ID | PURPOSE NAME | PURPOSE DESCRIPTION |
|---|---|---|
| A | WAREHOUSE | TO STORE DATA |
| B | ANALYTICS | TO PROFILE DATA |
| C | TESTING | TO TEST APPLICATIONS |

200B

| P.INDEX | DATA SUBJECT | DATA SUBJECT UNIQUE CODE | DERIVED PURPOSE | CONSENT |
|---|---|---|---|---|
| 1 | PETER HYEDEN | PH2876 | CUSTOMER GUIDANCE | YES |
| 2 | PETER HYEDEN | PH2876 | MARKETING | NO |

| DATA SUBJECT ID | PURPOSE A | PURPOSE B | PURPOSE C | PUPORSE D |
|---|---|---|---|---|
| 101 | YES | YES | YES | NO |
| 102 | YES | YES | NO | YES |
| 103 | NO | NO | YES | NO |
| 104 | NO | NO | NO | NO |

SYSTEM AND METHOD FOR CONSENT CENTRIC DATA COMPLIANCE CHECKING

PRIORITY CLAIM

The present invention claims priority to Indian Provisional specification (Title: Consent centric data protection compliance framework) No. 201721000532, filed in India on Jan. 5, 2017.

TECHNICAL FIELD

The embodiments herein generally relate to compliance checking, and, more particularly, to techniques for consent centric data compliance checking.

BACKGROUND

Many organizations obtain, store, and/or safeguard private information and/or data relating to individuals. Also, customers, employees, organizations and other entities are all eager to maintain adequate protection of their private information from unauthorized and unnecessary access. Data breach events may occur in which private data becomes unprotected, is removed, is stolen, and/or otherwise transferred from the control of an organization. Breach events may result from, for example, the actions of malicious outside parties, accidental disclosure, and/or other causes. Upon the occurrence of a breach event, one or more entities including, for example, federal government, state government, foreign government, political union, law enforcement, private entity, and other entities may each require compliance with complex specific rules, regulations, and laws related to data breach reporting. Complying with all of the applicable laws, rules, and regulations upon the occurrence of a data breach event may therefore be cumbersome. Thus, increasing compliance requirements for the organization are leading to a tougher operating environment for the organization.

SUMMARY

Embodiments of the present disclosure present technological improvements as solutions to one or more of the above-mentioned technical problems recognized by the inventors in conventional systems. In view of the foregoing, an embodiment herein provides methods and systems for consent centric data compliance checking.

In one embodiment, a processor-implemented method includes steps of: receiving multiple applications associated with an organization; deriving a purpose for each of the multiple applications associated with the organization; capturing consents of data subjects for the derived purpose of each of the multiple application in a data subject preference master; and performing reconciliation of the data subject preference master and data subjects' data available in the organization to determine consent lacking information by: sending a read request to the data subject preference master; receiving encrypted information associated with the read request from the data subject preference master in at least two parts; decrypting the information received in the at least two parts using associated decrypted keys; concatenating the information received in the at least two parts upon decryption; and performing reconciliation of the concatenated information and data subjects' data available in the organization to determine the consent lacking information.

In another embodiment, a system for consent centric data compliance checking is provided. The system includes a compliance checking device and a reconciliation engine communicatively coupled to the compliance checking device. The compliance checking device includes one or more memories; and one or more hardware processors, the one or more memories coupled to the one or more hardware processors wherein the one or more hardware processors are capable of executing programmed instructions stored in the one or more memories to: receive multiple applications associated with an organization; derive a purpose for each of the multiple applications associated with the organization; and capture consents of data subjects for the derived purpose of each of the multiple application in a data subject preference master. The reconciliation engine performs reconciliation of the data subject preference master and data subjects' data available in the organization to determine consent lacking information by: sending a read request to the data subject preference master; receiving encrypted information associated with the read request from the data subject preference master in at least two parts; decrypting the information received in the at least two parts using associated decrypted keys; concatenating the information received in the at least two parts upon decryption; and performing reconciliation of the concatenated information and data subjects' data available in the organization to determine the consent lacking information.

In yet another embodiment, a non-transitory computer-readable storage medium having embodied thereon a computer program for executing a method for consent centric data compliance checking. The method includes steps of: receiving multiple applications associated with an organization; deriving a purpose for each of the multiple applications associated with the organization; capturing consents of data subjects for the derived purpose of each of the multiple application in a data subject preference master; and performing reconciliation of the data subject preference master and data subjects' data available in the organization to determine consent lacking information by: sending a read request to the data subject preference master; receiving encrypted information associated with the read request from the data subject preference master in at least two parts; decrypting the information received in the at least two parts using associated decrypted keys; concatenating the information received in the at least two parts upon decryption; and performing reconciliation of the concatenated information and data subjects' data available in the organization to determine the consent lacking information.

It should be appreciated by those skilled in the art that any block diagram herein represents conceptual views of illustrative systems embodying the principles of the present subject matter. Similarly, it is appreciated that any flow charts, flow diagrams, state transition diagrams, pseudo code, and the like represent various processes which may be substantially represented in computer readable medium and so executed by a computing device or processor, whether or not such computing device or processor is explicitly shown.

It is to be understood that both the foregoing general description and the following detailed description are exemplary and explanatory only and are not restrictive of the invention, as claimed.

BRIEF DESCRIPTION OF THE FIGURES

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The methods and systems are not limited to the specific embodiments described herein. In addition, the method and system can be practiced independently and separately from other modules and methods described herein. Each device element/module and method can be used in combination with other elements/modules and other methods.

The manner, in which the system and method for consent centric data compliance checking, has been explained in details with respect to the FIGS. 1 through 4. While aspects of described methods and systems for consent centric data compliance checking can be implemented in any number of different systems, utility environments, and/or configurations, the embodiments are described in the context of the following exemplary system(s).

Figure 1:
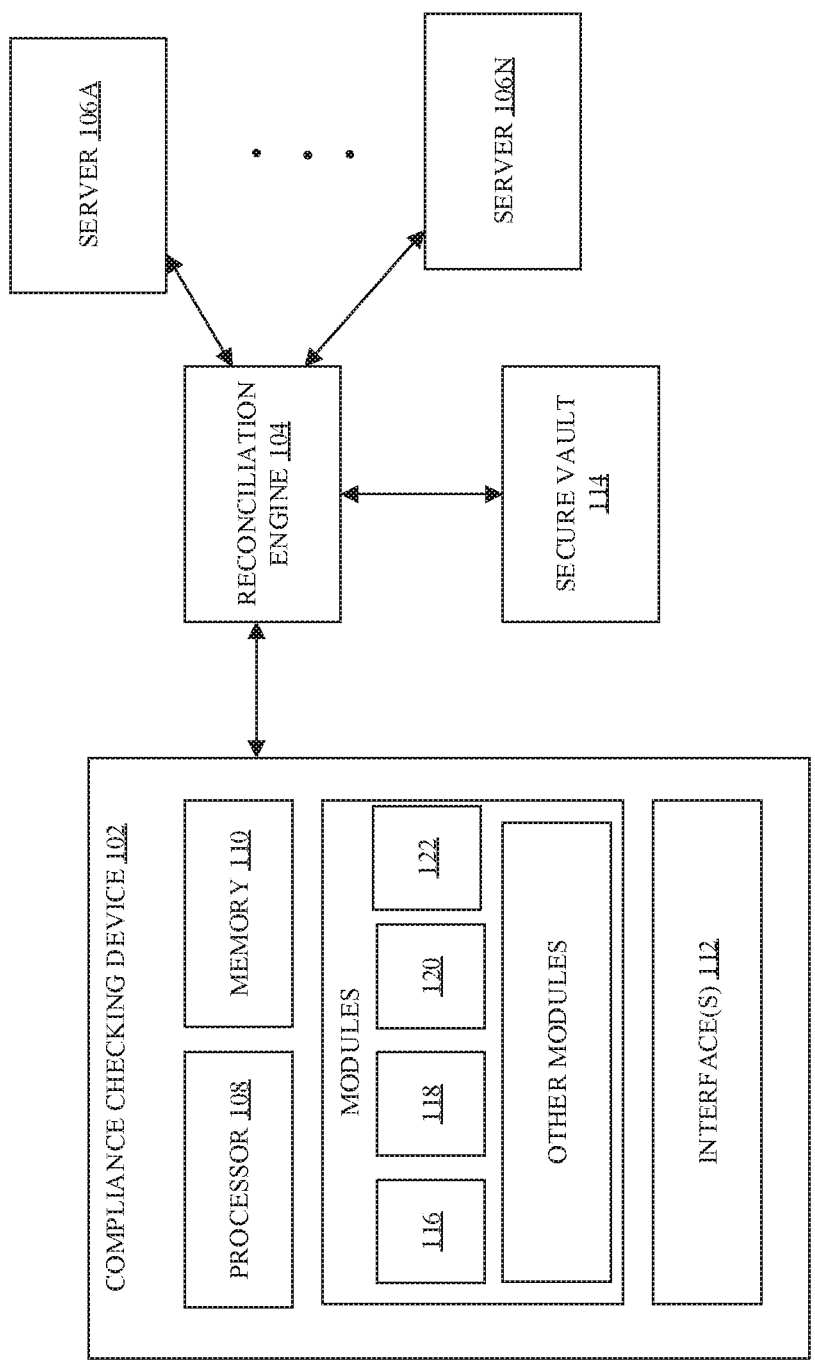
FIG. 1 illustrates a block diagram of a system for consent centric data compliance checking, according to an embodiment of a present subject matter.

FIG. 1 illustrates a block diagram of a system 100 for consent centric data compliance checking, according to an embodiment of a present subject matter. As shown in FIG. 1, the system 100 includes a compliance checking device 102, a reconciliation engine 104, multiple customer application data servers' 106A-N and a secure vault 114. In an example embodiment, the compliance checking device 102 may be embodied in, or is in direct communication with a computing device. The compliance checking device 102 includes or is otherwise in communication with one or more hardware processors such as processor(s) 108, one or more memories such as a memory 110, a network interface unit such as a network interface unit 112, and a secure vault 114. In an embodiment, the processor 108, memory 110, the network interface unit 112 and the secure vault 114 may be coupled by a system bus such as a system bus or a similar mechanism. Although FIG. 1 shows example components of the compliance checking device 102, in other implementations, compliance checking device 102 may contain fewer components, additional components, different components, or differently arranged components than depicted in FIG. 1.

The processor 108 may include circuitry implementing, among others, audio and logic functions associated with the communication. For example, the processor 108 may include, but are not limited to, one or more digital signal processors (DSPs), one or more hardware processors, one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 108 thus may also include the functionality to encode messages and/or data or information. The processor 108 may include, among other things, a clock, an arithmetic logic unit (ALU) and logic gates configured to support operation of the processor 108. Further, the processor 108 may include functionality to execute one or more software programs, which may be stored in the memory 110 or otherwise accessible to the processor 108.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation DSP hardware, network processor, application specific integrated circuit (ASIC), FPGA, read only memory (ROM) for storing software, random access memory (RAM), and non-volatile storage. Other hardware, conventional, and/or custom, may also be included.

The interface(s) 112 may include a variety of software and hardware interfaces, for example, interfaces for peripheral device(s), such as a keyboard, a mouse, an external memory, and a printer. The interface(s) 112 can facilitate multiple communications within a wide variety of networks and protocol types, including wired networks, for example, local area network (LAN), cable, etc., and wireless networks, such as Wireless LAN (WLAN), cellular, or satellite.

The one or more memories such as a memory 110, may store any number of pieces of information, and data, used by the system to implement the functions of the system. The memory 110 may include for example, volatile memory and/or non-volatile memory. Examples of volatile memory may include, but are not limited to volatile random access memory. The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 110 may be configured to store information, data, applications, instructions or the like for enabling the compliance checking device 102 to carry out various functions in accordance with various example embodiments. Additionally or alternatively, the memory 110 may be configured to store instructions which when executed by the processor 108 causes the system to behave in a manner as described in various embodiments. The memory 110 includes a data management module 116, a consent handler 118, a sensitivity analyzer 120, a data pseudonymisation filter 122 and other modules. The modules 116 to 122 and other modules include routines, programs, objects, components, data structures, etc., which perform particular tasks or implement particular abstract data types. The other modules may include programs or coded instructions that supplement applications and functions of the compliance checking device 102.

Figure 2A:
FIG. 2A illustrates an example table including key value purpose code of multiple applications, according to an embodiment of a present subject matter.
Figure 2B:
FIG. 2B illustrates an example purpose catalogue master, according to an embodiment of a present subject matter.

In operation, the data management module 116 receives multiple applications associated with an organization. Further, the data management module 116 derives a purpose for each of the multiple applications associated with the organization. In an example implementation, the data management module 116 analyzes functions in each of the multiple applications (i.e., application codes) based on roles accessing the multiple applications. Further, the data management module 116 derives information (flowchart, functional description and logic) associated with each of the functions in each of the multiple applications based on the analyzation. Furthermore, the data management module 116 derives the purpose for each of the multiple applications using the derived information. For example, the data management module 116 parses the logic and derives a high level purpose of each of the functions and in turn overall application. In other words, the data management module 116, using machine learning and decision tree, auto-discovers a key value purpose code of a specific application by combining the aspects of application business logic, roles accessing the data and the actual data being flown both inwards and outwards. In this embodiment, the data management module 116 performs data interaction level analysis, application analysis and business logic extraction and role based analysis for probable usage of data to derive the key value purpose code of the application. Further, the data management module 116 determines the purpose of the application based on the key value purpose code. In an example, the data management module 116 has an in-built repository which has different functions and key words of program code for each of specific language and corresponding interpretation. It also has built-in intelligence to interpret a code by analyzing the preceding and succeeding key words of a specific key word. With the help of the above, module will come up with Call Flows, Flow Chart. By combining this information with other touch points like insert, update, read into/from a database and consolidating this analysis at application/program level, module will be able to identify the purpose. An example table 200A including key value purpose codes and associated purposes is shown in FIG. 2A. The data management module 116 then stores the derived purposes in a purpose catalogue master (a purpose catalogue master 200B as shown in FIG. 2B).

In an example embodiment, the organization maintains a list of all information technology (IT) applications in one form or the other. This list is leveraged to create a digitized catalogue of all the activities performed on the data. Generally, the organization maintains various customer data masters for providing services to their customers and maintain employee masters for Human Resource Management. These data masters are necessary for running business as usual. For example, the telecom and utilities companies use customer master data in the billing systems for raising invoices and keeping track of payments. The banks use customer master data in their core banking solutions for providing unified experience across branches and assessing the usage of various offerings and potential for cross-sell. Similarly, the retail chains use customer master data in their loyalty management systems to build single customer profile. These existing customer masters or employee masters must be leveraged for minimalistic and non-intrusive preparation towards data protection compliance.

Figure 3A:
FIG. 3A illustrates an example data subject preference master, according to an embodiment of a present subject matter.
Figure 3B:
FIG. 3B illustrates another example data subject preference master, according to an embodiment of a present subject matter.

Furthermore, the data management module 116, in communication with the consent handler 118, captures consents of data subjects (end users) for the derived purpose of each of the multiple application in a data subject preference master (e.g., a data subject preference master 300A of FIG. 3A). In an example embodiment, the consent handler 118 captures consents from existing data subjects and provides mechanisms to the data subjects for exercising their data rights. The consent handler 118 provides inbuilt forms to capture the consents from the data subjects. The forms are automatically updated based on the number of purposes. The captured consents are linked with the data subject preference master 300A. A proper consent management is required to process these changing consents and incorporate these consents in any data provisioning to different processes.

In an example embodiment, the device management module 116 uses pre-built data models for building the data subject preference master (e.g., the data subject preference master 300A of FIG. 3A) by connecting with existing customer masters, employee master and shareholder master. For data protection compliance, it is clear that if the organization have to track the usage of every data subject's data, then the organization has to maintain the accurate master data of all the data subjects. Under these up-to-date master, the organization has to capture the consents of data subjects for various processes and the timelines for which consents are valid. This enhanced master data of all data subjects is termed as the data subject preference master. In addition to the usual information of customer master, the data subject preference master also contains the consents, the time line of consent and the purpose for which consent is given.

Also, the data management module 116 stores the purpose catalogue master and data subject preference master in the secure vault 114. Even though it is shown in FIG. 1 that the secure vault 114 is communicatively coupled to the compliance checking device 102, one skilled in the art can envision that the secure vault 114 can be a part of the device 102. For example, the vault is a combination of low level software and hardware making it a specialized vault which can be accessed only by native systems who understand the vault. Information in the vault 114 is secured through low level encryption routines making it impossible for anyone to perform any data access, theft or sabotage through add on software, Trojans or malwares as it is an isolated system without a standard operating system. When an entity accesses the information in the secure vault 114, an encrypted key or token representing accessing entity's identity (e.g. device fingerprint/MAC id/IP Address) and access credentials of accessing system is required which is audited in the vault 114 for tracking read requests to the vault 114. In an example embodiment, the secure vault 114 contain a component of consent handler 118 for capturing the data sharing preferences from end users. Further, writes or updates to the data sharing preferences are controlled through a list of predefined systems (e.g., device 104) who can write to the vault 114. The predefined systems are identified through a software token/key containing device identity (e.g. device fingerprint/MAC id/IP Address) and access credentials.

Furthermore, the data management module 116 recalibrates the consent once captured for specific applications based on any of the changes. In an example, referring to a first table and first row in the FIG. 3, App1 accessed by Role B is categorized into purpose code "C360X" which falls under "Customer Guidance" category. As Peter's consent is YES for "customer guidance" his data can be shared. In cases where App1 may be enhanced to cover marketing in future and Role "C" may be accessing this application for marketing purpose, then the data management module 116 after analyzing the enhanced application identifies that App 1 may fall under "C360Z" purpose code as well (Row 3 of the table 200A) and since the consent for marketing is "NO", the data is not be shared.

Also in operation, the reconciliation engine 104 performs reconciliation of the data subject preference master and data subjects' data available in the organization to determine consent lacking information. In an example implementation, the reconciliation engine 104 sends a read request to the secure vault 114. For example, the read request comprises a secure token containing a device identity and authorizing credentials. Further, the reconciliation engine 104 receives encrypted information associated with the read request from the data subject preference master in two or more parts (e.g., two parts). In an implementation, post auditing the read request, the raw encrypted data is read from the vault 114 which contains 2 parts. In one embodiment, a legitimate reader is able to segregate the 2 parts—one part is sent to a server (can be the device 102 or any server 106A-N or any other server) and the other part sent to the reconciliation engine 104. In another embodiment, the two parts of data can be sent to the reconciliation engine 104 when the reconciliation engine 104 has a machine with different decryption keys or two machines with different decryption keys In an embodiment, the secure vault 114 stores information about the data Subject preference master (as depicted in table 300B of FIG. 3B) in the form of data subject ID and the preferences by purpose. When this information divided into 2 parts, there is a hash value created for each data subject id and part 1 contains only data subject Id and part 2 contains mapping of hash value of data subject ID and data sharing preference information. Here, the hash value becomes the connecting link. The hash value is created using the machine finger print provided while accessing the vault 114. When there are 2 machines involved, two machine finger prints are involved and both are used in creating hash.

Furthermore, the reconciliation engine 104 decrypts the information received in the two parts using associated decrypted keys (e.g., machine/server Mac Id). In an example implementation, the reconciliation engine 104 decrypts the information received in the two parts using different decrypted keys. Moreover, the reconciliation engine 104 concatenates the information received in the two parts upon decryption. Both these parts are then merged to create the meaningful information on data sharing preferences for each data subject. In addition, the reconciliation engine 104 performs reconciliation of the concatenated information and data subjects' data available in the organization to determine the consent lacking information. This information is finally checked for geographical spread of data with respect to list Safe countries for sensitive data movement. Thus, the consent lacking information is used to give a baseline reconciliation report. This reconciliation report determines whether the processes or applications are using consent lacking records or information for any processing or not. The baseline report helps in prioritization of applications which need immediate attention and planning of proper remedial measures on the consent-lacking records. In some embodiments, after reconciliation report has been generated, the data remediation which is a reactive action is performed to amend the unauthorized data exposure. If by any means some purposes have access to restricted data, it can be identified during reconciliation. Those records which must not be present for a processes can be remediated in a way, preferred by organization. These remedial measures are performed at regular interval to accommodate changing preferences of the data subjects.

Furthermore, the data pseudonymisor 122 masks sensitive data and filters based on the consent. The data pseudonymisor 122 also allows data provision based on consent and approved geographies for continuous compliance. The data pseudonymisor (Masker) 122 sits between production systems and test systems for data masking. Rules for masking are extracted from a policy manager. Usually, processes are grouped based on purpose for which data is required and location is defined for each process. Using this data, a data provisioning policy, stating only pseudonymised data can be used for the processes which are performed in unsafe list of countries and do not require actual data, can be defined. The application of this policy ensures that data is transferred to unsafe list of countries only after pseudonymisation is performed on the real data. Further, it helps in avoiding the relocation of processes. With data pseudonymisation in place, any new process which do not require actual data can be easily setup in unsafe list of countries.

For data pseudonymisation to perform effectively through a policy, the sensitivity analyzer 120 identifies sensitive data used by various applications from various structured and unstructured sources of data. Various type of sensitive data can be easily discovered through a use of predefined or user-defined data patterns. For example, most credit card number follows a strict pattern of "aaaa bbbb cccc dddd". In some embodiments, based on the data elements metadata and pattern, the sensitive analyzer 120 can identify the sensitive fields across Databases, query results, systems, logs and onscreen fields in an automated way. The algorithm uses fuzzy logic, K-diff and K-anonymity factor. Quasi identification analysis and attacker analysis identifies sensitivity at combination level as well. After discovery, data is segregated into various data groups and subject areas for easy application of any data policy. This sensitive data must be maintained in a central repository so that if any rule has to be applied to limit their use, it can be governed centrally. It is advisable to scan the various data sources though a data discovery tool for the presence of sensitive data to avoid any leakage through manual process. In some embodiments, all the sensitive fields are mapped to the respective data elements so that the compliance can be checked at data element level.

Figure 4:
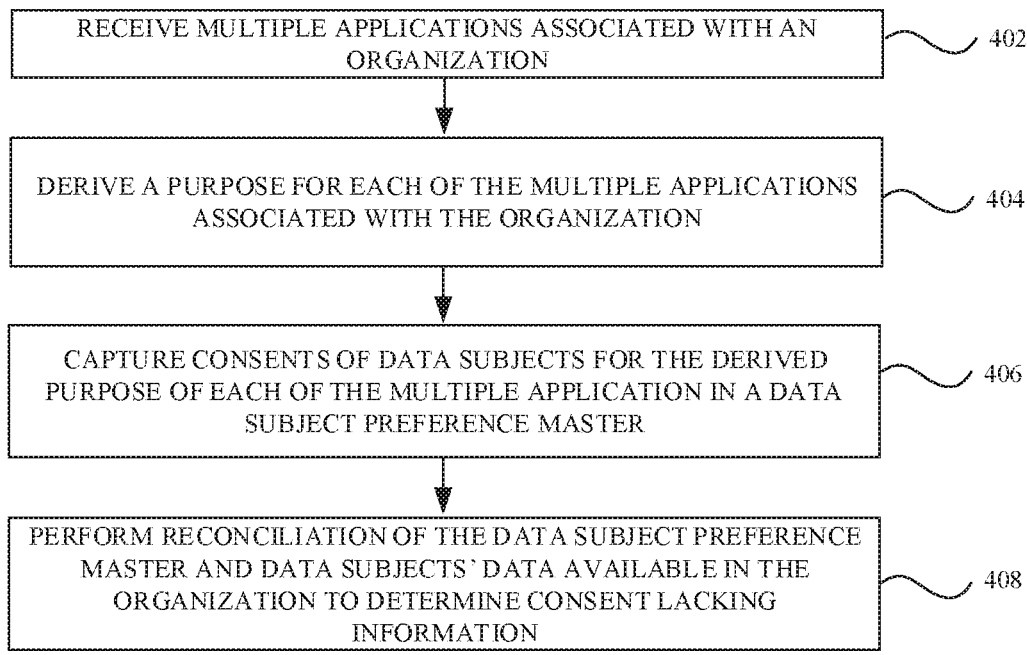
FIG. 4 illustrates a flow diagram of a method for consent centric data compliance checking, in accordance with an example embodiment.

FIG. 4 illustrates a flow diagram of a method for consent centric data compliance checking, in accordance with an example embodiment. The processor-implemented method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communication network. The order in which the method 400 is described is not intended to be construed as a limitation, and any number of the described method blocks can be combined in any order to implement the method 400, or an alternative method. Furthermore, the method 400 can be implemented in any suitable hardware, software, firmware, or combination thereof. In an embodiment, the method 400 depicted in the flow chart may be executed by a system, for example, the system 100 of FIG. 1.

At block 402, multiple applications associated with an organization are received. At block 404, a purpose for each of the multiple applications associated with the organization is derived. In an example implementation, functions in each of the multiple applications are analyzed based on roles accessing the multiple applications. Further, information associated with each of the functions in each of the multiple applications is derived based on the analyzation. Furthermore, the purpose for each of the multiple applications is derived using the derived information.

At block 406, consents of data subjects for the derived purpose of each of the multiple application are captured in a data subject preference master. At block 408, reconciliation of the data subject preference master and data subjects' data available in the organization is performed to determine consent lacking information. In an example embodiment, a read request is sent to the data subject preference master. For example, the read request includes a secure token containing a device identity and authorizing credentials. Further, encrypted information associated with the read request is received from the data subject preference master in at least two parts. Furthermore, the information received in the at least two parts are decrypted using associated decrypted keys. In an example, the information received in the at least two parts are decrypted using different decrypted keys. Moreover, the information received in the at least two parts is concatenated upon decryption. In addition, reconciliation of the concatenated information and data subjects' data available in the organization is performed to determine the consent lacking information. In some embodiments, consent based filtering of new data is performed for maintaining continuous data compliance.

The various embodiments described in FIGS. 1-4 propose an approach for consent centric data compliance checking. In this approach, consent once received is recalibrated for specific applications based on any of the changes. Data subject shall not be asked for consent on all varied usages of the data as the data subject may not have knowledge or time to understand all the possibilities and consequences of his or her data usage. Further, the list of purposes for which data may be shared and the data sharing preferences for each data subject against these purposes is stored in a secure vault as the data shared is sensitive. Thus, this information needs to be secured well for fraud prevention and risk management perspective.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is, however to be understood that the scope of the protection is extended to such a program and in addition to a computer-readable means having a message therein; such non-transitory computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The foregoing description of the specific implementations and embodiments will so fully reveal the general nature of the implementations and embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having,"

"containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor-implemented method comprising:
   receiving, by one or more hardware processors, multiple applications associated with an organization;
   deriving, by the one or more hardware processors, a purpose for each of the multiple applications associated with the organization, wherein the purpose for each of the multiple applications is derived based on information associated with functions in each of the multiple applications;
   capturing in a data subject preference master, by the one or more hardware processors, consents of data subjects for the derived purpose for each of the multiple applications;
   performing consent-based filtering of new data for maintaining continuous data compliance; and
   performing, by the one or more hardware processors, reconciliation of the data subject preference master and data available in the organization of the data subjects to determine information lacking consent of the data subjects, by:
   sending a read request to the data subject preference master;
   receiving encrypted information associated with the read request from the data subject preference master in at least two parts;
   decrypting the information received in the at least two parts using an associated decryption key, wherein one of the at least two parts comprises data subject identity and the remaining part comprises mapping of a hash value of the data subject identity and data sharing preference information;
   concatenating the information received in the at least two parts upon decryption; and
   performing reconciliation of the concatenated information and the data available in the organization of the data subjects to determine information lacking consent of the data subjects.

2. The method of claim 1, wherein deriving the purpose for each of the multiple applications, comprises:
   analyzing functions in each of the multiple applications based on roles accessing the multiple applications;
   deriving information associated with each of the functions in each of the multiple applications based on the analyzation; and
   deriving the purpose for each of the multiple applications using the derived information.

3. The method of claim 1, wherein the read request comprises a secure token containing a device identity and authorizing credentials.

4. The method of claim 1, wherein decrypting the information received in the at least two parts using the associated decryption key comprises:
   decrypting the information received in the at least two parts using different decryption keys.

5. A system comprising:
   a compliance checking device, wherein the compliance checking device comprises:
   one or more memories; and
   one or more hardware processors, the one or more memories coupled to the one or more hardware processors, wherein the one or more hardware processors are capable of executing programmed instructions stored in the one or more memories to:
   receive multiple applications associated with an organization;
   derive a purpose for each of the multiple applications associated with the organization, wherein the purpose for each of the multiple applications is derived based on information associated with functions in each of the multiple applications; and
   capture in a data subject preference master consents of data subjects for the derived purpose for each of the multiple applications;
   performing consent-based filtering of new data for maintaining continuous data compliance; and
   a reconciliation engine communicatively coupled to the compliance checking device for performing reconciliation of the data subject preference master and data available in the organization of the data subjects to determine information lacking consent of the data subjects, by:
   sending a read request to the data subject preference master;
   receiving encrypted information associated with the read request from the data subject preference master in at least two parts;
   decrypting the information received in the at least two parts using an associated decryption key, wherein one of the at least two parts comprises data subject identity and the remaining part comprises mapping of a hash value of the data subject identity and data sharing preference information;
   concatenating the information received in the at least two parts upon decryption; and
   performing reconciliation of the concatenated information and data available in the organization of the data subjects to determine information lacking consent of the data subjects.

6. The system of claim 5, wherein the one or more hardware processors are capable of executing programmed instructions to:
   analyze functions in each of the multiple applications based on roles accessing the multiple applications;
   derive information associated with each of the functions in each of the multiple applications based on the analyzation; and
   derive the purpose for each of the multiple applications using the derived information.

7. The system of claim 5, wherein the read request comprises a secure token containing a device identity and authorizing credentials.

8. The system of claim 5 wherein the reconciliation engine decrypts the information received in the at least two parts using different decryption keys.

9. A non-transitory computer readable medium embodying a program executable in a computing device for consent centric data compliance checking, the program comprising:
   a program code for receiving multiple applications associated with an organization;
   a program code for deriving a purpose for each of the multiple applications associated with the organization, wherein the purpose for each of the multiple applications is derived based on information associated with functions in each of the multiple applications;

a program code for capturing, in a data subject preference master, consents of data subjects for the derived purpose for each of the multiple applications;

a program code for performing consent-based filtering of new data for maintaining continuous data compliance; and a program code for performing reconciliation of the data subject preference master and data available in the organization of the data subjects to determine information lacking consent of the data subjects, by:

sending a read request to the data subject preference master;

receiving encrypted information associated with the read request from the data subject preference master in at least two parts;

decrypting the information received in the at least two parts using an associated decryption key, wherein one of the at least two parts comprises data subject identity and the remaining part comprises mapping of a hash value of the data subject identity and data sharing preference information;

concatenating the information received in the at least two parts upon decryption; and performing reconciliation of the concatenated information and the data available in the organization of the data subjects to determine information lacking consent of the data subjects.

* * * * *